United States Patent [19]

Shimoda et al.

[11] Patent Number: 5,210,112
[45] Date of Patent: May 11, 1993

[54] SOIL-STABILIZING AGENT AND A METHOD FOR SOIL-STABILIZING TREATMENT

[75] Inventors: Tetsuya Shimoda, Hachioji; Katuaki Ishikawa, Yokohama; Teruo Urano, Sano; Hiroshi Miyaji, Utsunomiya; Masatsune Ogura, Ichikawa, all of Japan

[73] Assignee: Nippon Hodo Co., Ltd., Tokyo, Japan

[21] Appl. No.: 728,030

[22] Filed: Jul. 8, 1991

Related U.S. Application Data

[63] Continuation of Ser. No. 530,435, Jun. 1, 1990, abandoned, which is a continuation of Ser. No. 259,374, Oct. 18, 1988, abandoned.

[30] Foreign Application Priority Data

Oct. 19, 1987 [JP] Japan ................... 62-261838

[51] Int. Cl.$^5$ ............................................. C09K 17/00
[52] U.S. Cl. .................................. 523/132; 524/424; 524/427; 524/433; 524/546
[58] Field of Search ............... 523/132; 524/424, 427, 524/433, 546

[56] References Cited

U.S. PATENT DOCUMENTS 3,838,092  9/1974  Vogt et al. ................... 524/546
4,134,862  1/1979  Eden et al. .................. 523/132

FOREIGN PATENT DOCUMENTS 60-191084  9/1985  Japan .

OTHER PUBLICATIONS

Urano, Teruo; Miyaji, Hiroshi, "Leach-Proof slaked lime fertilizers," 1986, vol. 104, ChemA6 50365j, p. 474.
Grant & Hackh's Chem Dictionary, 1987 p. 234 fibril.
Webster's II New Riverside Dictionary, 1984, p. 474 fibril, fibrillate, fibrillation.
Kirk-Othmer "Encyclopedia of Chemical Technology" 2nd Edition, vol. 9, 812-814.
Raiil et al., "Studies of the Morphology of Emulsion--Grade Polytetrafluoroethylene," Journal of Polymer Science: Part A-2, vol. 10 (1972), 1337-1349.

*Primary Examiner*—Paul R. Michl
*Assistant Examiner*—John J. Guarriello
*Attorney, Agent, or Firm*—Cushman, Darby & Cushman

[57] ABSTRACT

It is an object of the present invention to provide a soil-stabilizing agent with less emission of dust, good reactivity, good behavior at mixing and good dispersibility and a method for soil stabilizing treatment capable of restraining the emission of dust in the procedure of sprinkling and mixing of the soil-stabilizing agent to soil.

The soil-stabilizing agent according to the present invention comprises a mixture of a material mainly composed of quick lime and/or calcined dolomite and fibrillatable polytetrafluoroethylene resin.

And the method for soil-stabilizing treatment according to the present invention comprises the following steps; adding a mixture of a material mainly composed of quick lime and/or calcined dolomite and fibrillatable polytetrafluoroethylene resin to soil, and mixing them under the hydration heat generated by the reaction between the quick lime and/or calcined dolomite with moisture in the soil to form hydrated material.

When PTFE is in partially fibrillated state, emission of dust while sprinkling (primary dust) from the soil-stabilizing agent will be restrained as the particles of quick lime and/or calcined dolomite are enclosed in a cobweb-like net of the partially fibrillated PTFE, and emission of dust while mixing (secondary dust) is further restrained by a cobweb-like net of PTFE fibrillated further by mixing under hydration heat generated by the reaction of quick lime and/or calcined dolomite with moisture in the soil.

3 Claims, No Drawings

SOIL-STABILIZING AGENT AND A METHOD FOR SOIL-STABILIZING TREATMENT

This is a continuation of application Ser. No. 07/530,435, filed on Jun. 1, 1990, now abandoned, which is a continuation of application Ser. No. 07/259,374, filed on Oct. 18, 1988, also abandoned.

FIELD OF THE INVENTION

The present invention relates to a soil-stabilizing agent and a method for soil stabilizing treatment intended to prevent the emission of dust while sprinkling or mixing of CaO-containing soil-stabilizing agent such as quick lime or calcined dolomite, and to improve the reactivity, the behavior at mixing and the dispersibility of the soil stabilizing agent.

DESCRIPTION OF THE PRIOR ART

In Japan, weak ground composed of clayey soil such as a clayey soil mainly consisted of volcanic ashes as represented by Kanto-loam stratum is widely distributed.

These soils are difficult to handle from the view point of soil technology, and some measures are necessary to be taken to prevent the sinking of road and buildings after construction.

Measures to treat the weak ground has developed remarkably in Japan since 1960's with the development of materials and treating machines in the soil improvement works.

Although lime itself is not a main material now, the effect of soil improvement is essentially based on lime.

As the weak ground has a character of high moisture content in general, CaO-containing material such as quick lime (CaO) or calcined dolomite (CaO+MgO) is effective for improvement of the weak ground. The mechanism of soil improvement with CaO-containing material is shown in the following Table 1, representing the CaO-containing material by quick lime.

As the weak ground is composed of soil particles and pore water, rapid dehydration of the pore water by slaking reaction of the quick lime can improve the plasticity of the soil. The decrease in moisture content is promoted with the evaporation of water by generated heat, with the compression by expansion of the lime and with the adsorption of water by slaked lime powder formed. The slaked lime powder formed is ionized to $Ca^{2+}$ and $OH^-$, and the $Ca^{2+}$ makes an ion exchange reaction with other cations on the surface of the clayey soil to change the state of electric charge on the surface of soil particles to facilitate the coagulation of the soil particles. Then, with the lapse of time, the lime converts to a new material by pozzolan reaction with silica and alumina composing the clayey soil to solidify under an alkaline atmosphere.

As the soil stabilizing agent, the quick lime or the calcined dolomite is used in a form of powder or granule with a size of from dozens millimeter to under several millimeter. The amount to be used is usually about 3–20 percent of dry weight of the soil, though it is variable depending upon the kind of the soil and moisture content of the soil. Some additives can be used to promote the reaction of quick lime and/or calcined dolomite with the soil. As the additive, gypsum, slag cement, cement, clay powder, fine powder of iron oxide and fly ash etc. can be used.

There are many kinds of methods such as the central mixing method or field mixing method at the soil-stabilizing treatment, and the quick lime pile method or the deep layer mixing method at the ground-improving treatment.

Although the "ground-improving" and the "soil-stabilizing" have essentially same meaning, stabilizing treatment in a shallow layer is called as soil-stabilizing or soil-stabilizing treatment, and stabilizing treatment in a deep layer is called as ground-improvement in general. However, in the present invention, both cases are included.

TABLE 1

Quick lime is added to weak ground.

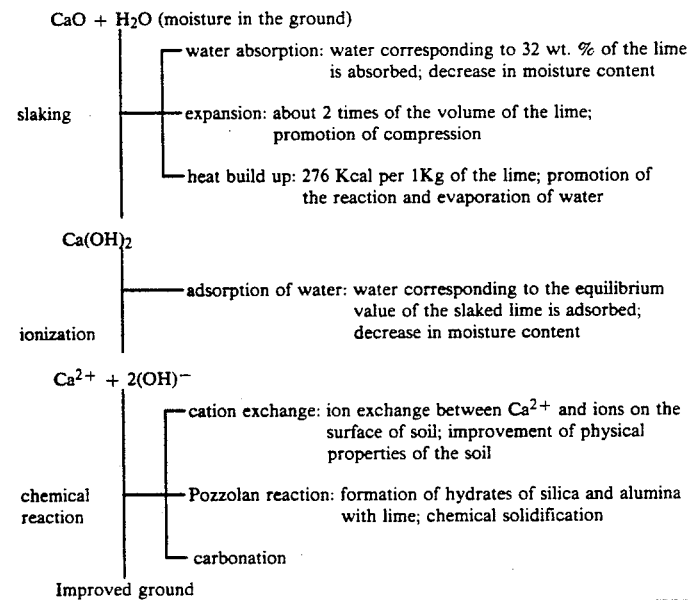

The decrease in moisture content is very effective for the soil stabilizing treatment in clayey soil with high moisture content. But the decrease in moisture content is not easy in many cases.

As mentioned above, when quick lime or the like is mixed with clayey soil with high moisture content, it reacts with moisture contained in the clayey soil immediately and makes mechanical and chemical change of the soil such as dehydration by formation of slaked lime (calcium hydroxide). It results in the decrease in moisture content, the decrease in plasticity index, the improvement in compaction property and the improvement in workability.

Shortening of the treatment time which can be achieved by rapid progress of the dehydration by the above-mentioned function of the quick lime is the most important merit of the quick lime type materials as the soil-stabilizing agent.

On the other hand, the dust problem is one of the demerit of the quick lime type soil-stabilizing agent.

A lot of fine dust of quick lime or its reaction product is emitted while sprinkling or mixing of quick lime. It causes many problems such as the contamination of environment, the health hazard to workers and the contamination of treating machines, and now people are worrying about these problems.

Although powdery or fine granular quick lime has better dispersibility and easiness of mixing and consequently it has better reactivity than lumpy or large granular quick lime, it is practically difficult to use it for methods other than the central mixing method because of the emission of dust at the time of sprinkling. So in the field mixing method, expensive lumpy or large granular quick lime is used to prevent the emission of dust while sprinkling.

However, even when the lumpy or large granular quick lime is used in the field mixing method, the quick lime tends to concentrate locally due to uneven mixing at primary mixing. In much the same way, a very large quantity of the quick lime is added intensively in a pile shape in the quick lime pile method. In these cases, contact of the quick lime with soil and absorption of moisture in the soil becomes insufficient, and a large mass of unreacted quick lime and slaked lime is apt to be formed locally.

Consequently, the emission of dust occurs actually not only while sprinkling but also while secondary mixing.

So, when the emission of dust should be avoided strictly such as the case of construction works in urban districts, alternative method using humid slaked lime or slaked lime slurry should be adopted at the sacrifice of the dehydration effect of the quick lime.

By the way, it has been known that a kind of polytetrafluoroethylene (referred as PTFE hereinafter) forms ultra fine cobweb-like fibrils under compression-shear at an appropriate temperature.

In Japanese Patent Publication Tokko Sho 52-32877 (corresponding to U.S. Pat. No. 3,838,064), it has been disclosed a method for dust-control treatment wherein an effective quantity of fibrillatable PTFE powder is added to dusty powder under compression-shear by agitation at a temperature of about 20° to 200° C.

Fibrillation of PTFE is said to start at about 20° C. However, in practical industrial purposes, it is desirable to give compression-shear at a temperature above 50° C., preferably above 80° C. Accordingly, when the temperature of the dusty powder is low, it is required to heat it to a temperature above 80° C., requiring enough heat energy and a heating apparatus.

In Japanese Patent Provisional Publication Tokkai Sho 60-191084, it has been proposed a manufacturing method of slaked lime fertilizer with anti-flux property whose particles are covered and coagulated with cobweb-like net wherein quick lime is added with fibrillatable PTFE powder dispersed in a certain quantity of water necessary to hydrate the quick lime and given a compression-shear by agitation at an elevated temperature caused by an exothermic hydration reaction of the quick lime and the water.

SUMMARY OF THE INVENTION

It is an object of the present invention to provide a soil-stabilizing agent with less emission of dust, good reactivity, good behavior at mixing and good dispersibility and a method for soil stabilizing treatment capable of restraining the emission of dust in the procedure of sprinkling and mixing of the soil-stabilizing agent to soil.

DETAILED DESCRIPTION OF THE PREFERRED EMBODIMENTS

The soil-stabilizing agent according to the present invention comprises a mixture of a material mainly composed of quick lime and/or calcined dolomite and fibrillatable polytetrafluoroethylene resin.

And the method for soil-stabilizing treatment according to the present invention comprises the following steps; adding a mixture of a material mainly composed of quick lime and/or calcined dolomite and fibrillatable polytetrafluoroethylene resin to soil, and mixing them under the hydration heat generated by the reaction between the quick lime and/or calcined dolomite with moisture in the soil to form hydrated material.

It should be understood that the soil-stabilizing treatment in the present invention includes not only the stabilizing treatment of shallow layer of the ground in narrow sense, but also the ground-improvement treatment in deep layer of the ground. It also should be understood that the weak ground means not only so-called weak ground, but also sludge-like ground.

Representative fibrillatable PTFE can be obtained by a method disclosed by Barry in U.S. Pat. No. 2,559,752 wherein tetrafluoroethylene monomer is polymerized in an aqueous medium containing fluorocarbon surfactant.

PTFE particle obtained by the above mentioned method is a colloidal particle having a particle size in a range of 0.05–0.5 micron and a surface area above 10 $m^2/g$. It can be obtained in a form of an aqueous dispersion or in a form of powder coagulated from said aqueous dispersion and either of which can be used in the present invention.

In the soil-stabilizing agent according to the present invention, PTFE is desirable to be in partially fibrillated state. The partially fibrillated state is explained as follows.

As mentioned above, particles of PTFE are fibrillated under compression-shear at an appropriate temperature. If an excess external force is given to the fibrils, aspect ratio of the fibril (length/cross sectional area of the fibril) becomes so large to the extent that the diameter of fibrils becomes too small to be unable to enclose dusty powder effectively by the fibrils.

The partially fibrillated state (it may be also expressed as half-fibrillated state) means a state wherein a part of PTEF particles is fibrillated or a state wherein the aspect ratio of fibril is small. From the viewpoint of phenomena, it means a state wherein PTFE is capable of further fibrillation and enclosing dusty powder again by further addition of compression/shear under heating. Said partially fibrillated state can be achieved by using rather much amount of PTFE or with rather weak mixing.

The soil-stabilizing agent wherein PTFE is in partially fibrillated state can be prepared by slightly stirring a mixture of quick lime and/or calcined dolomite and PTFE at a high temperature. The high temperature can be attained by the remaining heat after calcination of lime stone or dolomite or by the hydration heat generated by addition of aqueous dispersion of PTFE to quick lime and/or calcined dolomite, which means that no external heat is required.

When PTFE in the soil stabilizing agent is in partially fibrillated state, emission of dust while sprinkling (primary dust) from the soil-stabilizing agent is restrained as the particles of quick lime and/or calcined dolomite are enclosed in the cobweb-like net of the partially fibrillated PTFE, and emission of dust while mixing (secondary dust) is further restrained by cobweb-like net of PTFE fibrillated further by mixing under hydration heat generated by the reaction of quick lime and/or calcined dolomite with moisture in the soil.

Suitable amount of PTFE is 0.01–1.0 weight percent, preferably 0.03–0.5 weight percent of a material mainly composed of quick lime and/or calcined dolomite. If the amount is too small, the effect of dust control is poor, and if the amount is too much, it is not desirable from the viewpoint of dispersibility and cost.

The material mainly composed of quick lime and/or calcined dolomite is desirable to be powdery or fine granular state from the viewpoint of the easiness at mixing, the dispersibility and the reactivity.

The quick lime and/or the calcined dolomite is desirable to be calcined as weakly as possible, because its hydration reaction begins all at once, and generated heat can be used effectively.

For example, it is desirable to use a quick lime of which hydration activity value expressed by a titration volume of 4N-HCl for 50 g quick lime with a particle size of 2 millimeter sieve pass is more than 300 milliliter within 10 minutes.

So-called salt-calcined quick lime obtained by calcination of 1 ton of limestone in the presence of 2–5 kg of sodium chloride is preferable too from the viewpoint of effective utilization of reaction heat, as it is more porous than usual quick lime and has a good moisture absorbing ability to complete the hydration reaction within a short period of time.

In addition to the material mainly composed of quick lime and/or calcined dolomite and fibrillatable PTFE, the soil-stabilizing agent of the present invention may contain some additives such as gypsum, slag cement, cement, clay powder, fine iron oxide and fly ash and so on.

When the soil-stabilizing agent of the present invention is added to soil, heat of hydration is generated as the moisture in the soil is absorbed in the soil-stabilizing agent and reacts with the quick lime and/or the calcined dolomite in the soil-stabilizing agent to form hydrated compounds. If soil and the soil-stabilizing agent is mixed and stirred with good timing based on a data obtained by an experimental measurement of slaking rate and temperature increase, dusty powder is enclosed by cobweb-like net of further fibrillated PTFE, and the secondary emission of dust can be restrained.

At that time, if the quick lime and/or the calcined dolomite is in powdery or fine granular state, because of the behavior at mixing, the dispersibility and the reactivity is excellent, the heat of hydration generates quickly to reach the highest temperature in a short period of time with little deviation of the time to make it easy to catch the good timing of mixing and fibrillation of PTFE.

In this manner, the dust problems in the soil-stabilizing treatment such as the primary emission of dust at the sprinkling and the secondary emission of dust at the mixing can be restrained to make it possible to use powdery or fine granular quick lime and/or calcined dolomite having good reactivity and fundamentally suitable property for the soil-stabilizing treatment.

EXAMPLE 1

Preparation of a Soil-Stabilizing Agent 1,000 kg of quick lime pulverized by a crusher to a particle size of 5 millimeter sieve pass was charged in a 1,500 liters mortar mixer and 23.0 Kg of 1.96 weight percent aqueous dispersion of fibrillatable PTFE (made by diluting the aqueous dispersion of Teflon K20-J [trade name]: corresponding to 0.045 weight percent of PTFE per the quick lime) were added gradually under stirring of 27 rpm for one minute.

While stirring, a part of the quick lime was converted to slaked lime due to the reaction with water in the aqueous dispersion of PTFE accompanying some heat generation and the quick lime powder became dust free itself. Thus obtained composition was used as the soil-stabilizing agent.

Dust-Control Test 5 kg of the above mentioned soil-stabilizing agent was filled into a hole with a diameter of 15 cm and a depth of 20 cm dug in a Kanto loam soil road with a moisture content of 40–50 weight percent. A thermometer was set in a depth of 10 cm at the center of the hole.

As the thermometer showed 80° C. after 4 hours and 70° C. after 5 hours and swelling and powdering on the surface of the lime was observed by eyes, it was judged that the hydration reaction had finished. Then lime powder within 1–2 cm depth from the surface was collected to a vat by a scoop. The collected powder in the vat was not dusty after stirring once or twice by the scoop.

Then the soil around the hole within a diameter of 40 centimeter and the soil-stabilizing agent was mixed by a scoop.

Only a little emission of dust with negligible order was observed at the beginning of the mixing.

Comparative Experiment

A pile with a diameter of 30 centimeter and a thickness of 2.5 meter composed of quick lime with particle size of under 2 millimeter was set into a slit ground with a moisture content of 80–120 weight percent by a piling machine.

As the temperature in the depth of 50 cm at the center of the quick lime pile was 180°–200° C. at 30 minutes after the setting and became 150°–160° C. at 1 hour after the setting, it was concluded that slaking of the quick lime had finished. Soon after that, a mixing operation was carried out using a uniaxial mixing machine with propeller-shaped stirring blades capable of mixing within a range of 1 meter diameter with an average ascent or descent speed of 1.0 meter per minute and a torque of 500-1000 ton.meter. Although the behavior at mixing and the dispersibility of the lime was good, remarkable emission of dust was observed.

Then another pile of quick lime was set in the same manner as mentioned above. After 3 hours the quick lime became mud by hydration and adsorption of moisture in the soil. Then they were mixed by the uniaxial mixing machine. Although emission of dust was restrained, the lime which became mud state could not disperse in the silt soil uniformly, and the behavior at mixing and the dispersibility was bad.

EXAMPLE 2

A pile was set in the same manner as mentioned in the Comparative Experiment except for a soil-stabilizing agent prepared in the same manner as mentioned in Example 1 (quick lime added by PTFE: particle size of under 2 millimeter) was used for the pile and mixed by the uniaxial mixing machine.

Although a little amount of dust was emitted at the beginning of the mixing, the emission of dust was ceased after several times of rotation of the stirring blades, and the behavior at mixing and the dispersibility was good. It means that the mixing work can be carried out within a short period of time after the setting of the pile with good behavior at mixing and dispersibility and without a remarkable emission of dust.

We claim:

1. A soil-stabilizing agent comprising:
   a) not less than 90 weight percent of quick lime and-/or calcined dolomite;
   b) 0-10 weight % of slaked lime and/or hydrated calcined dolomite; and
   c) partially fibrillated polytetrafluoroethylene resin in an amount of 0.01-1.0 percent by weight of the material mainly composed of quick lime and/or calcined dolomite which has been added for dust control.

2. A soil-stabilizing agent according to claim 1, wherein the material mainly composed of quick lime and/or calcined dolomite is in powdery or fine granular state.

3. A soil-stabilizing agent according to claim 1, wherein the quick lime is a soft-burnt lime or a quick lime calcined in the presence of sodium chloride.

* * * * *